(12) United States Patent
Lee et al.

(10) Patent No.: US 10,174,811 B2
(45) Date of Patent: Jan. 8, 2019

(54) TRANSMISSION UNIT FOR WHEEL AND POWER-ASSISTED WHEEL SET

(71) Applicant: INDUSTRIAL TECHNOLOGY RESEARCH INSTITUTE, Hsinchu (TW)

(72) Inventors: Shao-Yu Lee, Hsinchu County (TW); Chia-Jui Hu, New Taipei (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 0 days.

(21) Appl. No.: 15/395,125

(22) Filed: Dec. 30, 2016

(65) Prior Publication Data
US 2018/0163819 A1    Jun. 14, 2018

(30) Foreign Application Priority Data
Dec. 14, 2016   (TW) .............................. 105141417 A

(51) Int. Cl.
*F16H 1/32*     (2006.01)
*B60K 7/00*     (2006.01)
(Continued)

(52) U.S. Cl.
CPC ............. *F16H 1/32* (2013.01); *B60K 7/0007* (2013.01); *B60K 17/046* (2013.01);
(Continued)

(58) Field of Classification Search
CPC ................. F16H 1/32; F16H 2001/327; F16H 2001/324; B60K 17/046; B60K 7/0007; B60K 17/145; B60K 2007/092
See application file for complete search history.

(56) References Cited

U.S. PATENT DOCUMENTS

| | | | | |
|---|---|---|---|---|
| 1,192,627 A | * | 7/1916 | Hatlee ....................... | F16H 1/32 475/176 |
| 4,338,831 A | * | 7/1982 | Rodaway .................. | F16H 1/32 475/169 |

(Continued)

FOREIGN PATENT DOCUMENTS

| CN | 1605769 A | 4/2005 |
|---|---|---|
| CN | 102753859 B | 3/2015 |

(Continued)

OTHER PUBLICATIONS

Chu et al., "Research, Development and Production of Powered-Assisted Wheelchair," The 14h National Conference on Vehicle Engineering, Oct. 30, 2099, Formosa University, 7 pages.

*Primary Examiner* — David J Hlavka
(74) *Attorney, Agent, or Firm* — Muncy, Geissler, Olds & Lowe, P.C.

(57) ABSTRACT

A transmission unit comprises a planet carrier, a first hollow planet gear, a second hollow planet gear, a first ring gear, and a second ring gear. The first hollow planet gear with a first module is coupled to the planet carrier through a bearing. The second hollow planet gear with a second module different from the first module is fixed to and moving in synchronization with the first hollow planet gear. The first ring gear encircles and meshes with the first hollow planet gear. The second ring gear encircles and meshes with the second follow planet gear.

14 Claims, 5 Drawing Sheets

(51) Int. Cl.
  *B60K 17/04* (2006.01)
  *B60K 17/14* (2006.01)
(52) U.S. Cl.
  CPC .... *B60K 17/145* (2013.01); *B60K 2007/0092* (2013.01); *F16H 2001/324* (2013.01)

(56) References Cited

U.S. PATENT DOCUMENTS

| | | |
|---|---|---|
| 5,896,775 A | 4/1999 | Southcott |
| 8,663,050 B2 | 3/2014 | Nichols et al. |
| 2006/0084547 A1* | 4/2006 | Dill ................... B60N 2/2252 475/162 |
| 2006/0111215 A1* | 5/2006 | Dean ....................... F16H 3/72 475/16 |
| 2008/0202832 A1* | 8/2008 | Ai ....................... B60K 7/0007 180/65.51 |
| 2010/0267508 A1 | 10/2010 | Hvolka et al. |
| 2013/0231211 A1* | 9/2013 | Samie ..................... F16H 1/32 475/177 |
| 2014/0171251 A1* | 6/2014 | Kullin ..................... F16H 1/32 475/176 |
| 2014/0196557 A1* | 7/2014 | Stocco ................. F16H 1/2863 74/409 |
| 2016/0053858 A1* | 2/2016 | Brassitos ................ F16H 1/28 475/331 |
| 2016/0263987 A1* | 9/2016 | Brownell ............. B60K 17/046 |
| 2017/0045118 A1* | 2/2017 | Hvass ..................... F16H 1/32 |

FOREIGN PATENT DOCUMENTS

| | | |
|---|---|---|
| CN | 104859781 | 8/2015 |
| EP | 2360045 A1 | 8/2011 |
| TW | I244917 B | 12/2005 |
| TW | I412213 B | 10/2013 |
| TW | M497208 U | 3/2015 |
| TW | 201627588 A | 8/2016 |
| TW | I561430 B | 12/2016 |

\* cited by examiner

TRANSMISSION UNIT FOR WHEEL AND POWER-ASSISTED WHEEL SET

This application claims the benefit of Taiwan application Serial No. 105141417, filed Dec. 14, 2016, the disclosure of which is incorporated by reference herein in its entirety.

TECHNICAL FIELD

The disclosure relates to a wheel set, and more particularly to a transmission unit for a wheel and a power-assisted wheel set.

BACKGROUND

In the market of power-assisted wheel set, power-assisted vehicles have wheels. There is a hub in the center of each wheel and the hub is fastened to the wheel by screws. A power system of a power-assisted vehicle requires high reduction ratio and has certain size limit. Besides, when designing a power-assisted wheel, space for anchoring, electrical connection, etc. is needed in the central area of the wheel. If a common planetary gear system is chosen as a transmission unit, there will not be enough space in the central area of the wheel because of the tight arrangement of gears, or the reduction ratio will not be ideal in order to have more space. If a planetary gear system with small difference in numbers of teeth is chosen, the size of the transmission unit will be within the limit; however, the mechanism may be locked while a reverse driving force is applied.

SUMMARY

A transmission unit for a wheel and a power-assisted wheel set are disclosed to response to the challenges in the art, such as size has to be compact, mechanism cannot be locked, more space is needed in the central area, etc.

According to one embodiment, a transmission unit for a wheel is disclosed. The transmission unit comprises a planet carrier, a first hollow planet gear, a second hollow planet gear, a first ring gear, and a second ring gear. The first hollow planet gear with a first module is coupled to the planet carrier through a bearing. The second hollow planet gear with a second module different from the first module is fixed to and moving in synchronization with the first hollow planet gear. The first ring gear encircles and meshes with the first hollow planet gear. The second ring gear encircles and meshes with the second follow planet gear.

According to another embodiment, a power-assisted wheel set is disclosed. The power-assisted wheel set comprises a wheel and a power module. The power module is provided on the wheel and comprises a power unit and an abovementioned transmission unit. The transmission unit is coupled to the power unit.

The above and other aspects of the disclosure will become better understood with regard to the following detailed description of the preferred but non-limiting embodiment(s). The following description is made with reference to the accompanying drawings.

DETAILED DESCRIPTION

Figure 1:
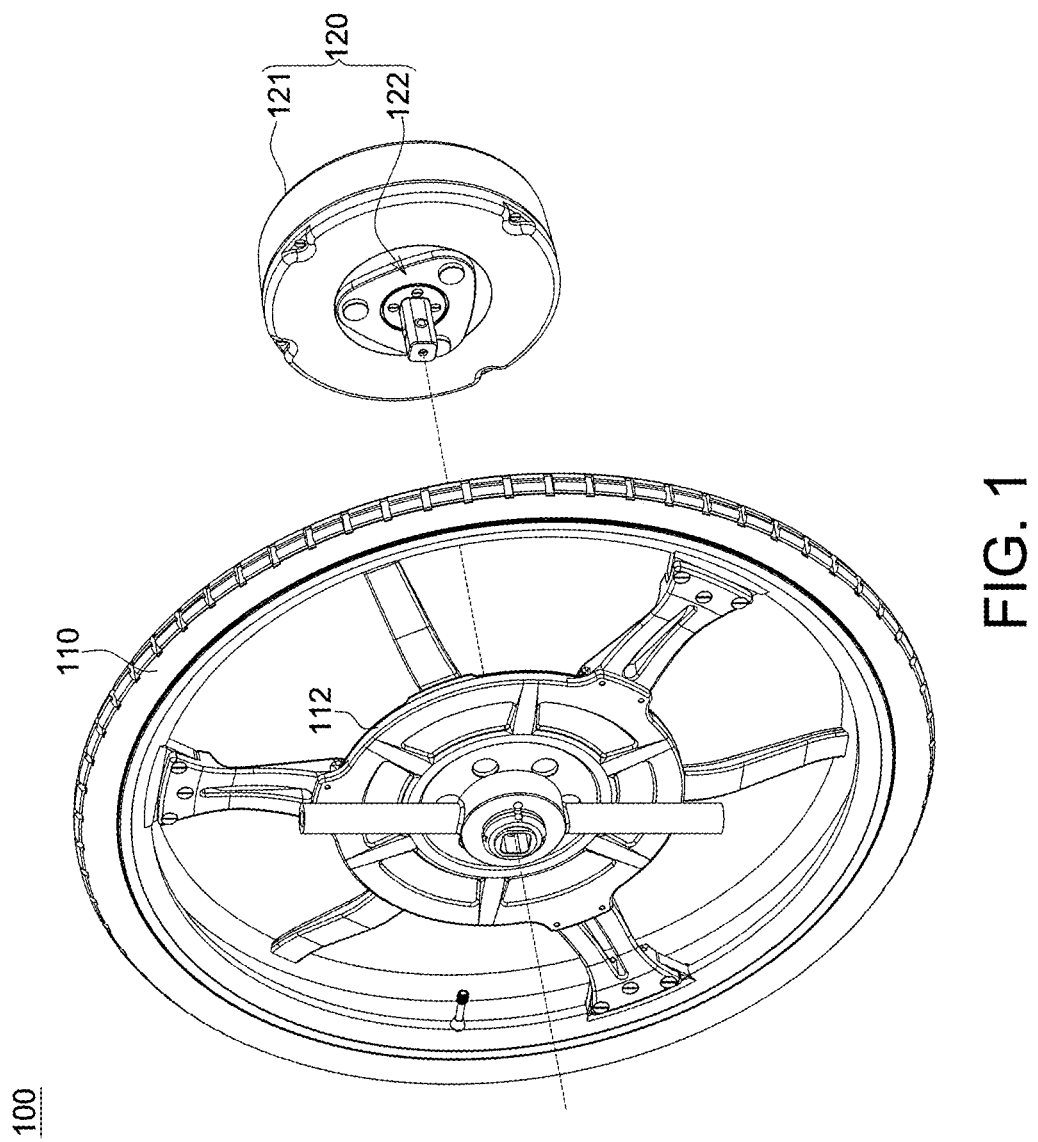
FIG. 1 is a breakdown drawing schematically showing a power-assisted wheel set according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1. According to one embodiment of the disclosure, a power-assisted wheel set 100 comprises a wheel 110 and a power module 120. The power module 120 is provided on a wheel hub 112 of the wheel 110 to revolve the wheel 110. In one embodiment, the power module 120 further comprises a connection unit 122 for connecting a power unit 121 to the wheel 110 such that the power-assisted wheel set 100 has a power module 120 which is detachable. In another embodiment, the power module 120 is not limited to be detachable. In the case that the power module 120 does not comprise the connection unit 122, the power unit 121 drives the wheel hub 112 via a transmission unit 130 (please refer to FIGS. 2 and 3). The abovementioned power-assisted wheel set 100 may apply to vehicles such as electric wheelchairs, electric motorcycles, or electric bicycles.

Figure 2:
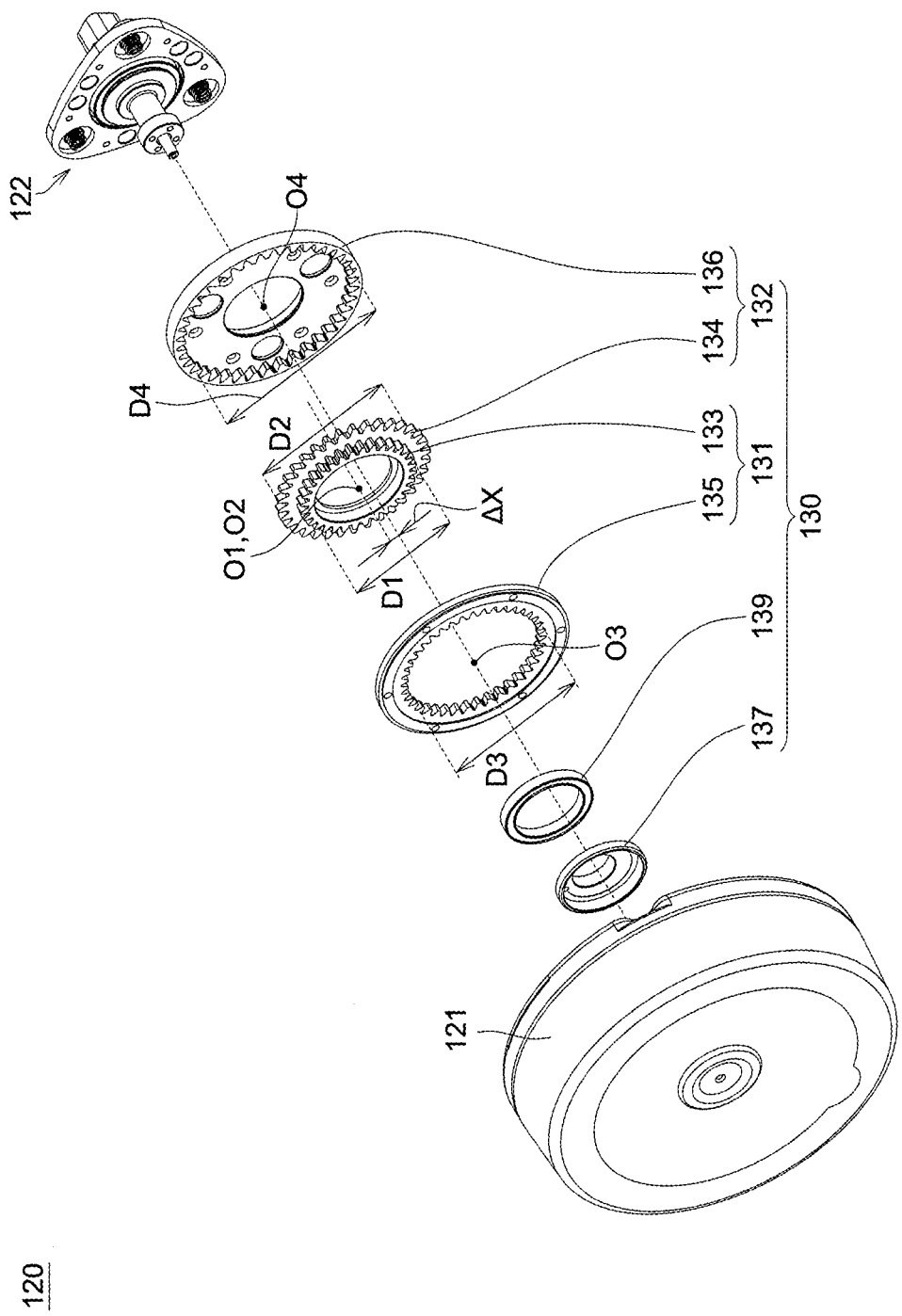
FIG. 2 is a breakdown drawing schematically showing a power unit of FIG. 1 in one perspective.
Figure 3:
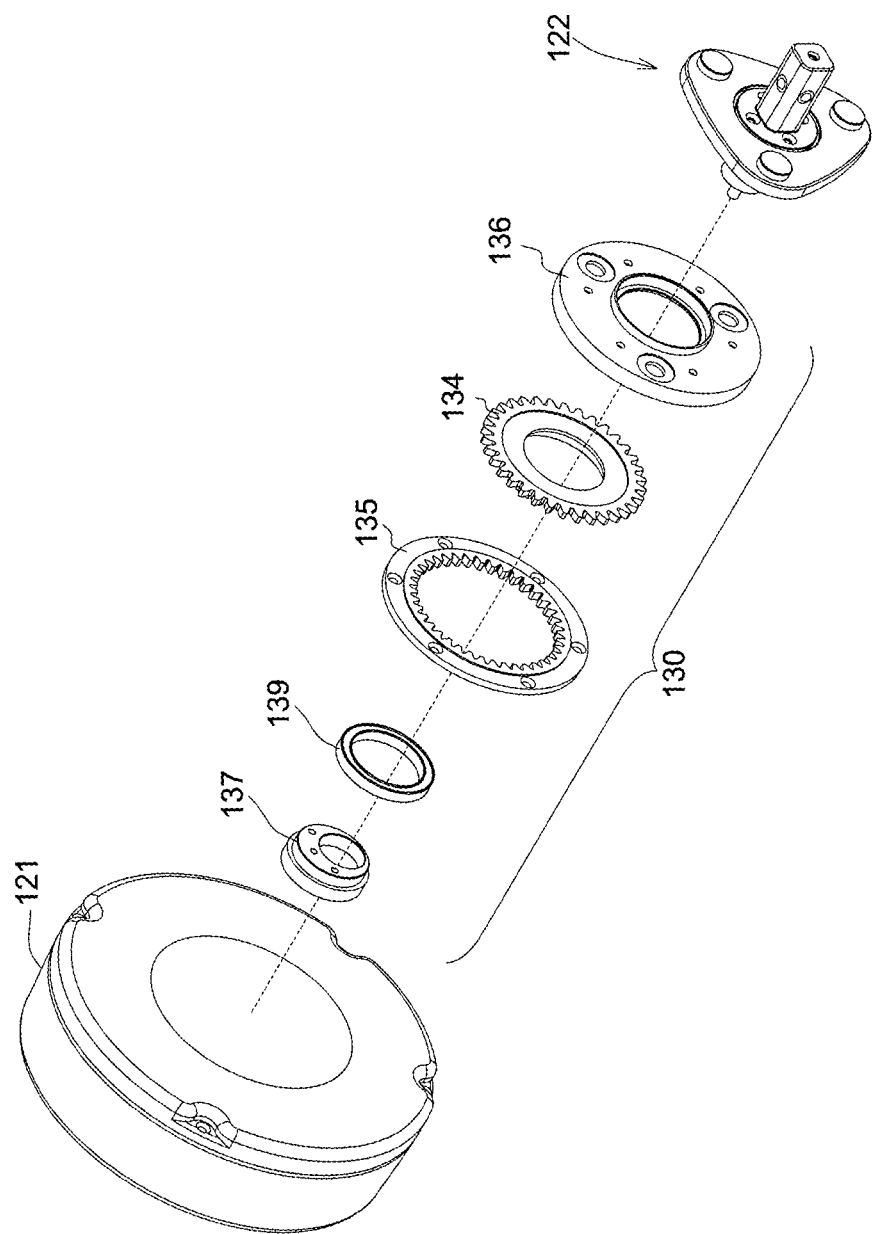
FIG. 3 is a breakdown drawing schematically showing the power unit of FIG. 1 in another perspective.

Please refer to FIGS. 2 and 3. The transmission unit 130 comprises a first hollow planet gear 133, a second hollow planet gear 134, a first ring gear 135, a second ring gear 136 and a planet carrier 137. The first hollow planet gear 133 is coupled to the planet carrier 137 through a bearing 139. Therefore, the first hollow planet gear 133 may revolve on its own axis with respect to the planet carrier 137 and revolve around the center of the power unit 121 with the planet carrier 137. The first hollow planet gear 133 and the second hollow planet gear 134 are fixed together and move in synchronization. In other words, the first hollow planet gear 133 and the second hollow planet gear 134 compose a single rotating gear and there is no relative movement between the first and second hollow planet gears 133 and 134. In addition, because there is only one first hollow planet gear 133 and one second hollow planet gear 134, the structure of the disclosure is simplified, compared to a common planetary gear system in which there are multiple planet gears inside a ring gear.

The first hollow planet gear 133 is a stage one planet gear and a drive gear. The first ring gear 135 encircles the first hollow planet gear 133 and meshes with the first hollow planet gear 133. The first ring gear 135 is a fixed gear such that the first hollow planet gear 133 revolves with respect to the first ring gear 135. The first hollow planet gear 133 and the first ring gear 135 compose a planetary gear set 131. Further, the second hollow planet gear 134 is a stage two planet gear and a drive gear. The second ring gear 136 encircles the second hollow planet gear 134 and meshes with the second hollow planet gear 134. The second ring gear 136 is a driven gear. The second hollow planet gear 134 and the second ring gear 136 compose another planetary gear set 132.

The first hollow planet gear 133 has a first module. The second hollow planet gear 134 has a second module. The first module is different from the second module. In one embodiment, the first module is 2 and the second module is 2.5, for example. In another embodiment, the first module is 2.5 and the second module is 2, for example. A module is a ratio of pitch diameter divided by number of teeth. Bigger the module, longer the distance between two adjacent teeth (i.e. circular pitch). The circumference of the gear equals pi times the diameter and also equals the number of teeth times the pitch. The module is defined as the diameter divided by the number of teeth, also defined as the pitch divided by pi, and thus the module is proportional to the pitch. Therefore, when two gears have the same or close modules, the gear with bigger module has larger circular pitch and larger pitch diameter, and the gear with smaller module has smaller circular pitch and smaller pitch diameter.

In one embodiment, numbers of teeth of the first hollow planet gear 133 and the second hollow planet gear 134 differ slightly, for example, the difference being 1~5 teeth; numbers of teeth of the first ring gear 135 and the second ring gear 136 are the same. In another embodiment, numbers of teeth of the first hollow planet gear 133 and the second hollow planet gear 134 are the same; numbers of teeth of the first ring gear 135 and the second ring gear 136 differ slightly, for example, the difference being 1~5 teeth.

Please refer to FIG. 2. The first hollow planet gear 133 has a first number of teeth N1 and a first pitch diameter D1, and the second hollow planet gear 134 has a second number of teeth N2 and a second pitch diameter D2; the first ring gear 135 has a third number of teeth N3 and a third pitch diameter D3, and the second ring gear 135 has a fourth number of teeth N4 and a fourth pitch diameter D4. According to the abovementioned definition of module, the first module is defined as D1/N1 or D3/N3 and the second module as D2/N2 or D4/N4. In the disclosure, the first module does not equal to the second module, that is, D1/N1≠D2/N2 and D3/N3≠D4/N4. In one embodiment, since the first number of teeth N1 and the second number of teeth N2 differs slightly (e.g., 1~5 teeth), and the third number of teeth N3 and the fourth number of teeth N4 are the same (N3=N4), it is acknowledged that the first pitch diameter D1 does not equal to the second pitch diameter D2 (D1≠D2) and the third pitch diameter D3 does not equal to the fourth pitch diameter D4 (D3≠D4). In another embodiment, since the first number of teeth N1 and the second number of teeth N2 are the same (N1=N2), and the third number of teeth N3 and the fourth number of teeth N4 differs slightly (e.g., 1~5 teeth), it is acknowledged that the first pitch diameter D1 does not equal to the second pitch diameter D2 (D1≠D2) and the third pitch diameter D3 does not equal to the fourth pitch diameter D4 (D3≠D4). Therefore, in the transmission unit 130 according to the embodiments, the two planetary gear sets 131 and 132 with small difference in numbers of teeth may have different circular pitches and different pitch diameters based on different modules.

In one embodiment, for example, the first hollow planet gear 133 has 32 teeth, the second hollow planet gear 134 has 34 teeth, the first ring gear 135 and the second ring gear 136 each has 40 teeth. The reduction ratio is calculated as follows: 1/(1−(34*40/40'''32))=−32/2=−16. In other words, the reduction ratio output by the two planetary gear sets 131 and 132 is 16. It can be seen from this that the transmission unit 130 of the disclosure has a high reduction ratio.

Figure 6A:
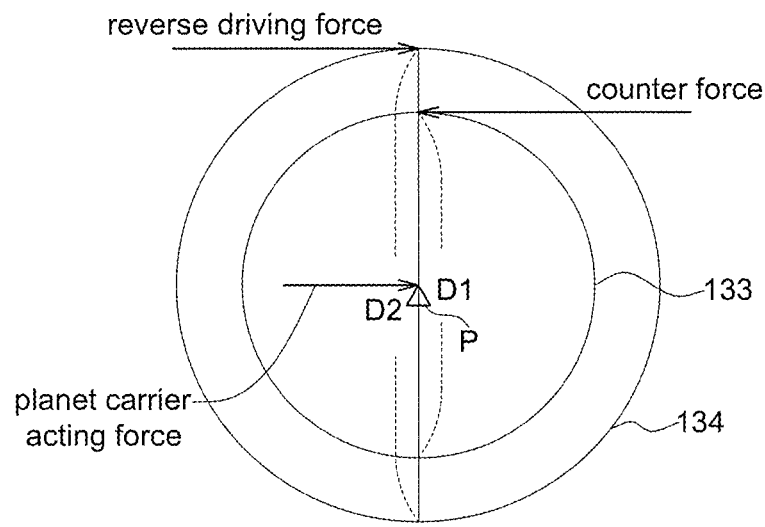
FIGS. 6A and 6B are schematic drawings showing a resultant moment produced by a reverse driving force and a counter force is not zero.
Figure 6B:
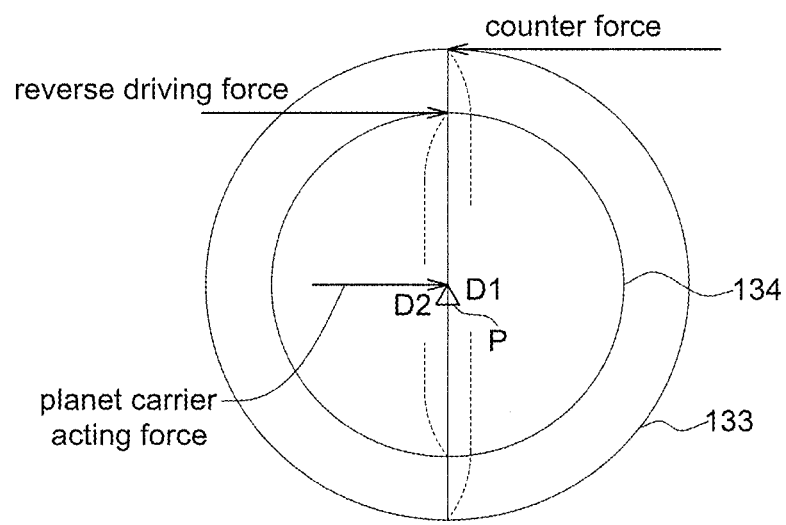

In the abovementioned embodiments, because the planetary gear sets 131 and 132 have different modules, the difference in numbers of teeth of the two planetary gear sets 131 and 132 is within the required range (1~5 teeth) and the difference in pitch diameters of the planetary gear sets 131 and 132 is huge enough, thereby avoiding the planetary gear set 132 is locked by the planetary gear set 131 while a reverse driving force is applied (please refer to FIGS. 6A and 6B).

Figure 4:
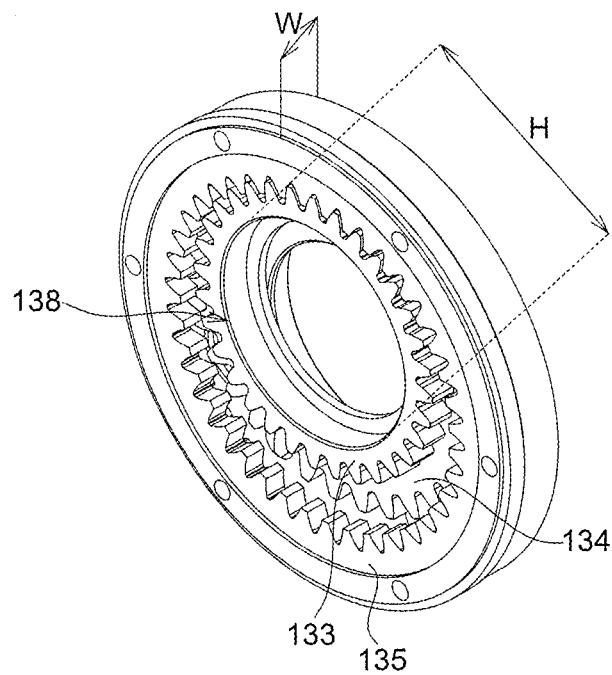
FIG. 4 is an assembly drawing schematically showing an assembly of a ring gear and a planet gear in a transmission unit according to one embodiment.

Please refer to FIG. 2. A center O1 of the first hollow planet gear 133 is offset from a center O3 of the first ring gear 135, a center O2 of the second hollow planet gear 134 is offset from a center O4 of the second ring gear 136, and the offset is ΔX, for example. That is, the first hollow planet gear 133 and the second hollow planet gear 134 are eccentric gears. Please refer to FIG. 4. In one embodiment, a circular hole 138 formed in the central areas of the first hollow planet gear 133 and the second hollow planet gear 134 may allow a shaft (not shown in the figure) to pass through. In one embodiment, the diameter H of the circular hole 138 is, for example, 25 mm or larger; however, the inventive concept is not limited to the exemplary embodiment set forth herein.

Figure 5:
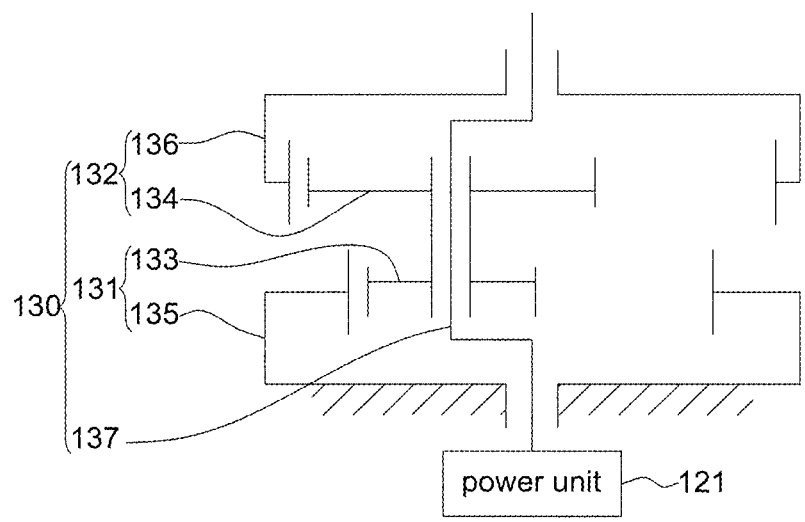
FIG. 5 is a schematic drawing showing gear arrangement in the transmission unit.

Please refer to FIGS. 3 and 5. The planet carrier 137 is coupled to the power unit 121. The planet carrier 137 is coupled to the first hollow planet gear 133 through a bearing 139 such that the eccentric first and second hollow planet gears 133 and 134 revolve around the center of the power unit 121 along with the planet carrier 137. In one embodiment, the power unit 121 comprises, for example, a stator and a rotor (not shown in the figures) and the stator revolves the rotor; however, the power unit 121 may be various power supply devices other than the mechanism composed of the stator and the rotor.

Please refer to FIG. 5. The first hollow planet gear 133 and the second hollow planet gear 134 are coupled to the power unit 121 at input end through the bearing (not shown in FIG. 5), and the first ring gear 135 is fixed to the power unit 121 at fixed end. Thereby, the power unit 121 input power to the first hollow planet gear 133 and the second hollow planet gear 134 through the planet carrier 137, and the second ring gear 136 meshing with the second hollow planet gear 134 output the power with reduction ratio. In one embodiment, the second ring gear 136 further transmit the power to the connection unit 122 (shown in FIG. 1) to revolve the wheel 110 coupled with the connection unit 122.

Since the transmission unit 130 according to the disclosure uses the planetary gear system with small difference in numbers of teeth, the transmission unit 130 is small in size and large in reduction ratio. In one embodiment, the overall thickness W of an assembly of the two planetary gear sets 131 and 132 may be reduced to 20 mm, preferably 15 mm, to meet the requirement of a compact size. In addition, in one embodiment, the reduction ratio of the transmission unit 130 is 16 or above, allowing the power unit 121 to operate in higher efficiency (i.e., higher speed) while the minimum rotational speed of the wheel 110 located at the output end is about 50 rpm; therefore, the power requirement of the power-assisted vehicle operating in low speed is met.

Please refer to FIG. 6A. In one embodiment, on the premise of small difference in numbers of teeth, since the module of the second hollow planet gear 134 is set to be larger than the module of the first hollow planet gear 133, the pitch diameter D2 of the second hollow planet gear 134 is larger than the pitch diameter D1 of the first hollow planet gear 133. When a reverse driving force is applied (e.g., a user revolves the wheel 110 by human physical strength) to the second hollow planet gear 134 with larger pitch diameter D2, the first hollow planet gear 133 receives a counter force induced by the first ring gear 135 for countering the reverse driving force. In the circumstance that the force of the system is in equilibrium, i.e., the reverse driving force, the counter force and a planet carrier acting force are balanced, since the first hollow planet gear 133 and the second hollow planet gear 134 have different pitch diameters, a resultant moment produced by the reverse driving force, the counter force and the planet carrier acting force about a point P is not zero (i.e., the moment of the system is not in equilibrium); therefore, the first hollow planet gear 133, the second hollow planet gear 134 and the planet carrier 137 are still rotatable. In addition, please refer to FIG. 6B. In another embodiment, on the premise of small difference in numbers of teeth, since the module of the second hollow planet gear 134 is set to be smaller than the module of the first hollow planet gear 133, the pitch diameter D2 of the second hollow planet gear 134 is smaller than the pitch diameter D1 of the first hollow planet gear 133. When a reverse driving force is applied (e.g., a user revolves the wheel 110 by human physical strength) to the second hollow planet gear 134 with smaller pitch diameter D2, the first hollow planet gear 133 receives a counter force induced by the first ring gear 135 for countering the reverse driving force. In the circumstance that the force of the system is in equilibrium, i.e., the reverse driving force, the counter force and the planet carrier acting force are balanced, since the first hollow planet gear 133 and the second hollow planet gear 134 have different pitch diameters, a resultant moment produced by the reverse driving force, the counter force and the planet carrier acting force about the point P is not zero (i.e., the moment of the system is not in equilibrium); therefore, the first hollow planet gear 133, the second hollow planet gear 134 and the planet carrier 137 are still rotatable. In a common planetary gear system with small difference in numbers of teeth, since the pitch diameters of gears are the same as a result of the same modules, a resultant moment produced by the reverse driving force and the counter force is or close to zero, causing the mechanism to be locked. On the contrary, it can be seen from the above, in the two disclosed embodiments, the problem of mechanism being locked is avoided. In the power-assisted wheel set 100 according to the disclosure, since the two planetary gear sets 131 and 132 have different modules (and thus different pitch diameters), the resultant moment produced by the reverse driving force and the counter force will not be zero; therefore, the user may choose from his/her own physical strength or the motor as the power source without concerning the problem of mechanism being locked.

According to the disclosed embodiments, by using two planetary gear sets 131 and 132 with small difference in numbers of teeth, the transmission unit for a wheel and the power-assisted wheel set allow high reduction ratio in compact size for improving operating efficiency of the power module. In addition, since each of the two planetary gear sets 131 and 132 with different modules has only one planet gear, the two planetary gear sets 131 and 132 may have a larger difference in the module and a circular hole with larger diameter, thus avoiding the problems of the mechanism being locked and lack of space in the central area.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A transmission unit for a wheel, comprising:
    a planet carrier,
    a first hollow planet gear, having a first module and a first circular pitch, the first hollow planet gear being coupled to the planet carrier through a bearing, and the first module being proportional to the first circular pitch,
    a second hollow planet gear, having a second module different from the first module and a second circular pitch different from the first circular pitch, the second hollow planet gear being fixed to and moving in synchronization with the first hollow planet gear, and the second module being proportional to the second circular pitch,
    a first ring gear, encircling and meshing with the first hollow planet gear, and
    a second ring gear, encircling and meshing with the second follow planet gear.

2. The transmission unit for the wheel according to claim 1, wherein the first module is smaller than the second module.

3. The transmission unit for the wheel according to claim 1, wherein the first module is larger than the second module.

4. The transmission unit for the wheel according to claim 1, wherein numbers of teeth of the first hollow planet gear and the second hollow planet gear differ from 1 to 5, and numbers of teeth of the first ring gear and the second gear are the same.

5. The transmission unit for the wheel according to claim 1, wherein numbers of teeth of the first ring gear and the second ring gear differ from 1 to 5 teeth, and numbers of teeth of the first hollow planet gear and the second hollow planet gear are the same.

6. The transmission unit for the wheel according to claim 1, wherein the first ring gear is a fixed gear, the first and second hollow planet gears are drive gears, and the second ring gear is a driven gear.

7. The transmission unit for the wheel according to claim 1, wherein a center of the first hollow planet gear is offset from a center of the first ring gear, and a center of the second hollow plant gear is offset from a center of the second ring gear.

8. A power-assisted wheel set, comprising:
    a wheel, and
    a power module, provided on the wheel, the power module comprising a power unit and a transmission unit coupled to the power unit, wherein the transmission unit comprises:
    a planet carrier,
    a first hollow planet gear, having a first module and a first circular pitch, the first hollow planet gear being coupled to the planet carrier through a bearing, and the first module being proportional to the first circular pitch,
    a second hollow planet gear, having a second module different from the first module and a second circular pitch different from the first circular pitch, the second hollow planet gear being fixed to and moving in synchronization with the first hollow planet gear, and the second module being proportional to the second circular pitch,
    a first ring gear, encircling and meshing with the first hollow planet gear, and
    a second ring gear, encircling and meshing with the second follow planet gear.

9. The power-assisted wheel set according to claim 8, wherein the first module is smaller than the second module.

10. The power-assisted wheel set according to claim 8, wherein the first module is larger than the second module.

11. The power-assisted wheel set according to claim 8, wherein numbers of teeth of the first hollow planet gear and the second hollow planet gear differ from 1 to 5, and numbers of teeth of the first ring gear and the second gear are the same.

12. The power-assisted wheel set according to claim 8, wherein numbers of teeth of the first ring gear and the second ring gear differ from 1 to 5 teeth, and numbers of teeth of the first hollow planet gear and the second hollow planet gear are the same.

13. The power-assisted wheel set according to claim 8, wherein the first ring gear is a fixed gear, the first and second hollow planet gears are drive gears, and the second ring gear is a driven gear.

14. The power-assisted wheel set according to claim 8, wherein a center of the first hollow planet gear is offset from a center of the first ring gear, and a center of the second hollow plant gear is offset from a center of the second ring gear.

* * * * *